J. E. BINNS, Jr.
COVERING WHEEL FOR GRAIN DRILLS.
APPLICATION FILED JULY 10, 1911.
1,020,681.
Patented Mar. 19, 1912.
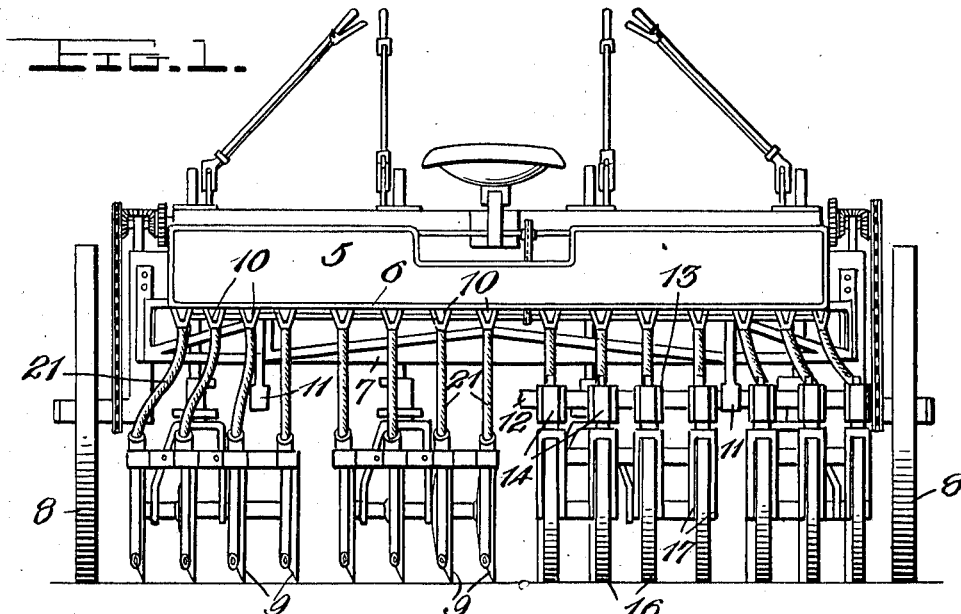
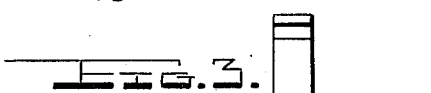
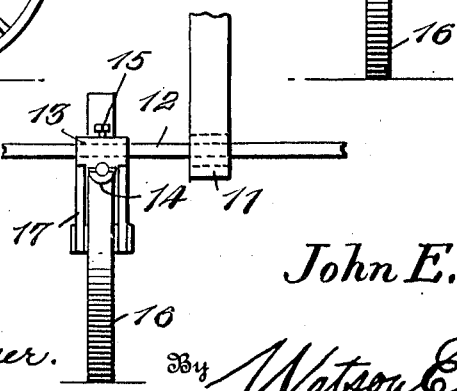
Witnesses
Chas. L. Griesbauer.
L. G. Ellis.
Inventor
John E. Binns Jr.,
By Watson E. Coleman
Attorney
COLUMBIA PLANOGRAPH CO., WASHINGTON, D. C.

UNITED STATES PATENT OFFICE.

JOHN E. BINNS, JR., OF NASHVILLE, TENNESSEE.

COVERING-WHEEL FOR GRAIN-DRILLS.

1,020,681.   Specification of Letters Patent.   Patented Mar. 19, 1912.

Original application filed April 15, 1911, Serial No. 621,431. Divided and this application filed July 10, 1911. Serial No. 637,606.

*To all whom it may concern:*

Be it known that I, JOHN E. BINNS, Jr., a citizen of the United States, residing at Nashville, in the county of Davidson and State of Tennessee, have invented certain new and useful Improvements in Covering-Wheels for Grain-Drills, of which the following is a specification, reference being had to the accompanying drawings.

This invention relates to covering wheels for grain drills of that character shown and described in my prior application for patent, Serial Number 621,431, filed April 15th, 1911, of which this application is a division.

The present invention has for its primary object the provision of improved means for mounting the covering wheels which are located in the rear of the grain depositing spouts whereby said wheels may move vertically and transversely so that they may pass safely over obstructions.

Another object of the invention is to provide pivotally mounted covering wheels of the above character, means normally holding the wheel yieldingly in contact with the ground, and means for adjusting the wheel transversely of the machine.

A further object of the invention is to provide an improved mounting for covering wheels which is extremely simple in construction, may be manufactured at small cost and is very durable and efficient in practical use.

With the above and other objects in view, the invention consists in the novel features of construction, combination and arrangement of parts hereinafter fully described and claimed, and illustrated in the accompanying drawings, in which—

Figure 1 is a rear elevation of a grain drill, certain of the parts being removed; Fig. 2 is a side elevation of one of the covering wheels showing the same mounted upon the supporting frame. Fig. 3 is a detail edge view of one of the covering wheels and the mounting therefor; and Fig. 4 is a detail plan view of the same.

Referring in detail to the drawing 5 designates the grain box which is mounted upon a rearwardly extending frame 6 rigidly bolted or otherwise secured to the main frame 7 of the machine which is mounted upon and supported between the ground wheels 8. A plurality of ground opening disks 9 are mounted in the main frame 7, said disks being arranged in gangs, said gangs also carrying the grain depositing spouts 10 whereby the grain is deposited in drills into the furrows opened by the disks.

The above arrangement of parts constitutes the construction of the usual grain drill, and it will be understood that the present invention is not limited to this particular arrangement, the utility of my device being in no wise dependent thereon.

As hereinbefore stated, my invention resides specifically in the means for mounting the covering wheels which are usually provided in machines of this character to cover the grain after the same is deposited with earth and to this end the depending hangers 11 are formed upon the rear end of the frame 6. In the lower ends of these hangers, a transversely disposed bar 12 is rigidly secured. Upon this bar 12 a plurality of bearings are adjustably mounted. These bearings each consist of a rectangular portion 13 through which the bar 12 is disposed and a sleeve 14 formed upon one face of said rectangular portion. Set screws 15 are threaded in the portions 13 of the bearings and are adapted to bind upon the bar 12 to rigidly secure the bearings in their adjusted positions. The covering wheels 16 are rotatably mounted in the lower ends of the arms 17 which are journaled at their upper ends upon the lower ends of the pivot bolts 18 which are rotatably mounted in the cylindrical bearing sleeves 14. The upper pivoted ends of the arms 17 are angularly disposed as shown at 18 and to the same one end of a spring 20 is secured, the other end of said spring being secured to the portion 13 of the bearing.

The depositing spouts 10 are each connected by a conducting hose 21 with the grain box 5, and in the forward movement of the machine, the grain is discharged from said box into the depositing spouts, said spouts depositing the grain in the furrows formed by the ground opening disks 9.

It will be observed that the covering wheels 16 are located directly in line with the depositing spouts 10 in the rear thereof, and these wheels are adapted to cover the deposited grain with earth. Should the wheels encounter obstructions in the movement of the machine, they will move in a vertical plane owing to the pivotal connection of the arms 17 to the lower end of the pivot bolt 18, the spring 20 normally holding the peripheries of the wheels in contact with the ground. By mounting the wheels for bodily pivotal movement transversely of the machine, the machine may be properly guided or turned without danger of breaking the arms 17 which connect the wheels to the pivot bolts.

From the foregoing it is believed that the construction and operation of the device will be fully understood.

By sliding the bearings upon the bar 12 the covering wheels may be readily adjusted transversely with relation to the grain depositing spouts. The mounting of the wheels is extremely simple, and effectually prevents injury thereto.

While I have shown and described the preferred form and construction of the various elements, it will be understood that the device is susceptible of considerable modification without departing from the essential feature or sacrificing any of the advantages of the invention.

Having thus described the invention what is claimed is:—

1. The combination with a grain drill including a frame having depositing spouts mounted therein, of a transverse bar fixed in said frame, rectangular sleeves longitudinally adjustable upon said bar, set screws carried by said sleeves to rigidly fix the same in their adjusted positions, vertical bearings formed on said sleeves, a pivot bolt rotatably mounted in each of the bearings, wheel supporting arms pivoted to the lower end of said bolt, and a spring connected to said arms adjacent their pivoted ends and to the adjustable sleeve to yieldingly hold the wheel in engagement with the ground.

2. The combination with a grain drill including a frame having depositing spouts mounted therein, of a transverse bar fixed in said frame, a rectangular sleeve longitudinally adjustable on the bar, a vertical bearing formed on one face of said sleeve, a pivot bolt rotatably mounted in said bearing and extending below the same, spaced wheel supporting arms pivotally mounted on the lower end of said bolt and having rearwardly extending portions, and a spring connected to said rearwardly extending portions of the arms and to the adjustable sleeve to yieldingly hold the wheel in engagement with the ground.

In testimony whereof I hereunto affix my signature in the presence of two witnesses.

JOHN E. BINNS, JR.

Witnesses:
D. W. BINNS,
R. A. RHODES.

---

Copies of this patent may be obtained for five cents each, by addressing the "Commissioner of Patents, Washington, D. C."